United States Patent
Mirani et al.

(10) Patent No.: US 6,434,741 B1
(45) Date of Patent: *Aug. 13, 2002

(54) METHOD AND APPARATUS FOR DEBUGGING OF OPTIMIZED CODE USING EMULATION

(75) Inventors: Rajiv Mirani, Sunnyvale, CA (US); Bruce A. Olsen, Sudbury; Harish Patil, Westborough, both of MA (US)

(73) Assignee: Hewlett-Packard Company, Palo Alto, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/070,541

(22) Filed: Apr. 30, 1998

(51) Int. Cl.[7] .............................................. G06F 9/44
(52) U.S. Cl. ..................................................... 717/124
(58) Field of Search ........................... 395/704; 717/4, 717/8, 9, 124, 125–129, 134, 151–161; 702/119; 703/23–28; 714/28, 35, 38

(56) References Cited

U.S. PATENT DOCUMENTS

| 4,953,084 A | | 8/1990 | Meloy et al. | 395/704 |
| 5,101,342 A | * | 3/1992 | Namimoto | 395/800 |
| 5,274,815 A | | 12/1993 | Trissel et al. | 712/226 |

(List continued on next page.)

OTHER PUBLICATIONS

Univ. of California, Electrical Engineering and Computer Sciences (Ph.D. Thesis) (1983) pp 159–170, P. Zellweger, "An Interactive High–Level Debugger for Control–Flow Optimized Programs".

ACM Trans. on Programming Languages and Systems, vol. 4, Jul. 1982, pp 323–344, J. Hennessy, "Symboloc Debugging of Optimized Code".

ACM SIGPLAN '88, Jun. 1988, pp 125–134, Coutant et al,"A Practical Approach to Source–Level Debugging of Globally Optimized Code".

Conf. Record of the 20th Annual ACM Symposium on Principled of Programming Languages, Jan. 1993, pp 371–383, A. Adl–Tabatabai et al, "Evicted Variables and the Interaction of Global Register Allocation and Symbolic Debugging".

Proceedings of the ACM SIGPLAN '93, Jun. 1993, pp 13–25, A. Adl–Tabatabai et al, "Detection and Recovery of Endangered Variables Caused by Instruction Scheduling".

(List continued on next page.)

*Primary Examiner*—Gregory Morse
*Assistant Examiner*—Wei Zhen

(57) ABSTRACT

The invention is a method for debugging a machine code of a program that has been subjected to an optimizing action, wherein the machine code may have been reordered, duplicated, eliminated or transformed so as not to correspond with the program's source code order. The method derives a table which associates each machine code instruction with a source construct for which it was generated. The user sets a breakpoint at a breakpoint P in the source code where execution is to stop. Then the method determines at least one corresponding location for the breakpoint in the machine code through use of the table, and executes, by native execution or emulation, only machine code instructions which correspond to source constructs that precede the breakpoint in the source code order. The method further enables a comparison of the results of two passes of emulation (in different orders) to detect a class of bugs that are particularly hard to find: bugs caused by optimizer errors and user bugs that manifest themselves only in the optimized executable.

18 Claims, 7 Drawing Sheets

U.S. PATENT DOCUMENTS

| | | | |
|---|---|---|---|
| 5,295,260 A | * 3/1994 | Pribnow | 395/575 |
| 5,371,747 A | * 12/1994 | Brooks et al. | 371/19 |
| 5,446,900 A | * 8/1995 | Kimelman | 717/4 |
| 5,450,586 A | 9/1995 | Kuzara et al. | 395/704 |
| 5,535,391 A | 7/1996 | Hejlsberg et al. | 395/709 |
| 5,659,753 A | 8/1997 | Murphy et al. | 395/705 |
| 5,790,858 A | * 8/1998 | Vogel | 717/4 |
| 5,881,288 A | 3/1999 | Sumi et al. | 395/704 |
| 5,915,083 A | 6/1999 | Ponte | 714/30 |
| 5,930,495 A | * 7/1999 | Christopher, Jr. et al. | 395/500 |
| 5,956,479 A | 9/1999 | McInerney et al. | 714/38 |
| 5,966,702 A | 10/1999 | Fresko et al. | 707/1 |
| 6,091,896 A | 7/2000 | Curreri et al. | 395/704 |
| 6,125,439 A | 9/2000 | Tremblay et al. | 712/202 |
| 6,021,408 A1 | 2/2001 | Ledain et al. | 707/8 |
| 6,263,489 B1 | * 7/2001 | Olsen et al. | 717/4 |

OTHER PUBLICATIONS

Carnegie Mellon University, School of Computer Science, (Ph.D. Thesis), 1996, pp 33–43, A. Adl–Tabatabai et al., "Source–Level Debugging of Scalar Optimized Code".

ACM SIGPLAN '92 (1992) pp 1–11, G. Brooks et al, "A New Approach to Debugging Optimized Code".

ACM Transactions on Programming Languages and Systems, vol. 16, May 1994, pp. 387–427, M. Copperman, "Debugging Optimized Code Without Being Misled".

* cited by examiner

FROM FIG.4a

- BEGINNING WITH MACHINE INSTRUCTION "I", DEBUGGER EMULATES INSTRUCTIONS THAT CORRESPOND TO SOURCE STATEMENTS PRECEDING P, AND IGNORES OTHERS. DEBUGGER STORES VALUES RESULTING FROM EMULATION

- IF AN EXIT POINT IS ENCOUNTERED, RESTART APPLICATION, BEGINNING AT "I"

- WHEN LW ENCOUNTERED, REPORT BREAKPOINT AT S TO USER

METHOD AND APPARATUS FOR DEBUGGING OF OPTIMIZED CODE USING EMULATION

REFERENCE TO RELATED APPLICATION

This Application is related to U.S. patent application Ser. No. 09/070,542, now U.S. Pat No. 6,263,489 filed concurrently herewith and entitled "Method and Apparatus for Debugging of Optimized Code" to Olsen et al.

FIELD OF THE INVENTION

This invention relates to a method and apparatus for debugging of optimized machine code and more particularly, to a method and apparatus for debugging optimized machine code wherein optimization effects on the machine code are made as transparent to the user as possible.

BACKGROUND OF THE INVENTION

To fully utilize many data processors, an increasing number of executable machine codes (binaries) are being generated by compilers which incorporate advanced optimization techniques. With this increase, it has become a necessity to provide a clear, correct and effective way for programmers to debug highly optimized code.

There are two primary aspects associated with code optimization that make the debugging of optimized machine code difficult. First, optimization complicates the mapping between the source code and the machine code. Due to code duplication, elimination, and re-ordering caused by optimization, it is hard for the debugger to decide where in the machine code to set a breakpoint, when the user sets a source breakpoint, or which source line to report faults in when an execution exception occurs. See: T. Zellweger, "Interactive Source-Level Debugging of Optimized Programs", PhD thesis, Electrical Engineering and Computer Sciences, University of California, Berkeley, Calif. 94720, 1984. Second, it makes reporting values of source variables inconsistent with what the user expects (or even impossible). More specifically, the optimizations that are performed destroy the simple source-to-object correlation present in unoptimized codes. Hence when inspecting a halted program being debugged, there is generally no straight-forward answer to questions such as "Where am I?" and "What's happened so far?". Further, since variables may live in different locations at different points in the program (and indeed, at no locations at some points), reporting variable values becomes complicated. Much research in this area has concentrated on the second of these problems.

John Hennessy's seminal paper (J. Hennessy, "Symbolic Debugging of Optimized Code", ACM Transactions on Programming Languages and Systems, Vol. 4, pp. 323–344, July 1982) presented algorithms to detect variables whose values do not reflect the source program and examined the problem of recovering the correct values. These algorithms have been corrected and refined by others.

In the past decade, there have been several research works using different strategies to solve the problem of debugging optimized code. Hennessy (cited above) first introduced the concept of non-current variables and provided an algorithm to detect these variables. He also provided an algorithm to recover non-current variables in locally optimized code. Zellweger, "An Interactive High-Level Debugger for Control-Flow Optimized Programs", SIGPLAN Notices, pp. 159–171, August 1983) proposed and implemented a method to recover the expected behavior of a program by inserting path determiners (hidden breakpoints) into the program to enable the debugger to decide which execution path had been taken. The Zellweger method can only deal with code optimized by "function inlining" and "cross jumping".

Coutant et al., "Doc: A Practical Approach to Source-Level Debugging of Globally Optimized Code", Proceedings of the ACM SIGPLAN '88 Conference on Programming Language Design and Implementation, pp. 125–134, June 1988, modified an existing C compiler and a source-level symbolic debugger to support optimized code debugging. The optimizations they addressed are global register allocation, induction variable elimination, copy propagation, and instruction scheduling. The most noticeable part of their work is their solution for data value problems. Their compiler builds "range" data structures during optimization which provides the debugger with run-time locations of variables and recovery functions for eliminated variables.

Gupta, in "Debugging Code Reorganized by a Trace Scheduling Compiler", Structured Programming, pp. 141–150, July 1990 proposed an approach to debug code reorganized by a trace scheduling compiler. In the Gupta approach, the user has to specify the commands for monitoring values before compilation, and these commands are added and compiled into the program. At run time, the debugger stops when a monitor command is executed and reports the monitored information to the user.

Works done by Adl-Tabatabai and Gross focus on data value problems. They have proposed algorithms using data flow analysis to detect non-resident and endangered variables. Their methods provide limited capability to recover the expected value of endangered variables caused by local and global optimization. See: A. Adl-Tabatabai and T. Gross, "Evicted Variables and the Iteration of Global Register Allocation and Symbolic Debugging", in Conference Record of the 20th Annual ACM Symposium on Principles of Programming Languages, pp. 371–383, January 1993; A. Adl-Tabatabai and T. Gross, "Detection and Recovery of Endangered Variables Caused by Instruction Scheduling", in Proceedings of the ACM SIGPLAN '93 Conference on Programming Language Design and Implementation, pp. 13–25, June 1993; and Adl-Tabatabai, "Source-Level Debugging of Globally Optimized Code", PhD thesis, School of Computer Science, Carnegie Mellon University, Pittsburgh, Pa. 15213, (1996).

In summary, the prior approaches to debugging optimized code have focused on making the user aware of the potentially surprising effects of optimization. While some attempt to recover the expected behavior of the original program, their capability has been limited.

Accordingly, it is an object of this invention to enable the debugging of optimized code without making the user aware of the affects of the optimization.

It is another object of this invention to provide a method and apparatus for the debugging of optimized code wherein actions specified in the source appear to take place in source order.

It is a further object of this invention to provide a method and apparatus for the debugging of optimized code wherein automatic bug detection is accomplished.

SUMMARY OF THE INVENTION

The invention is a method for debugging a machine code of a program that has been subjected to an optimizing action, wherein the machine code may have been reordered, duplicated, eliminated or transformed so as not to correspond with the program's source code order. The method derives a table which associates each machine code instruction with a source construct for which it was generated. The user sets a breakpoint at a breakpoint P in the source code where execution is to stop. Then the method determines at least one corresponding location for the breakpoint in the machine code through use of the table, and executes, by native execution or emulation, only machine code instructions which correspond to source constructs that precede the breakpoint in the source code order. The method further enables a comparison of the results of two passes of emulation (in different orders) to detect a class of bugs that are particularly hard to find: bugs caused by optimizer errors and user bugs that manifest themselves only in the optimized executable.

BRIEF DESCRIPTION OF THE DRAWINGS

FIGS. 4a and 4b illustrate a flow diagram of the overall operation of the method of the invention.

DETAILED DESCRIPTION OF THE PREFERRED EMBODIMENT

The debugging method of this invention hides the effects of machine code optimizations from the user during interactive debugging and enables recovery of expected values of variables at breakpoints.

Figure 1:
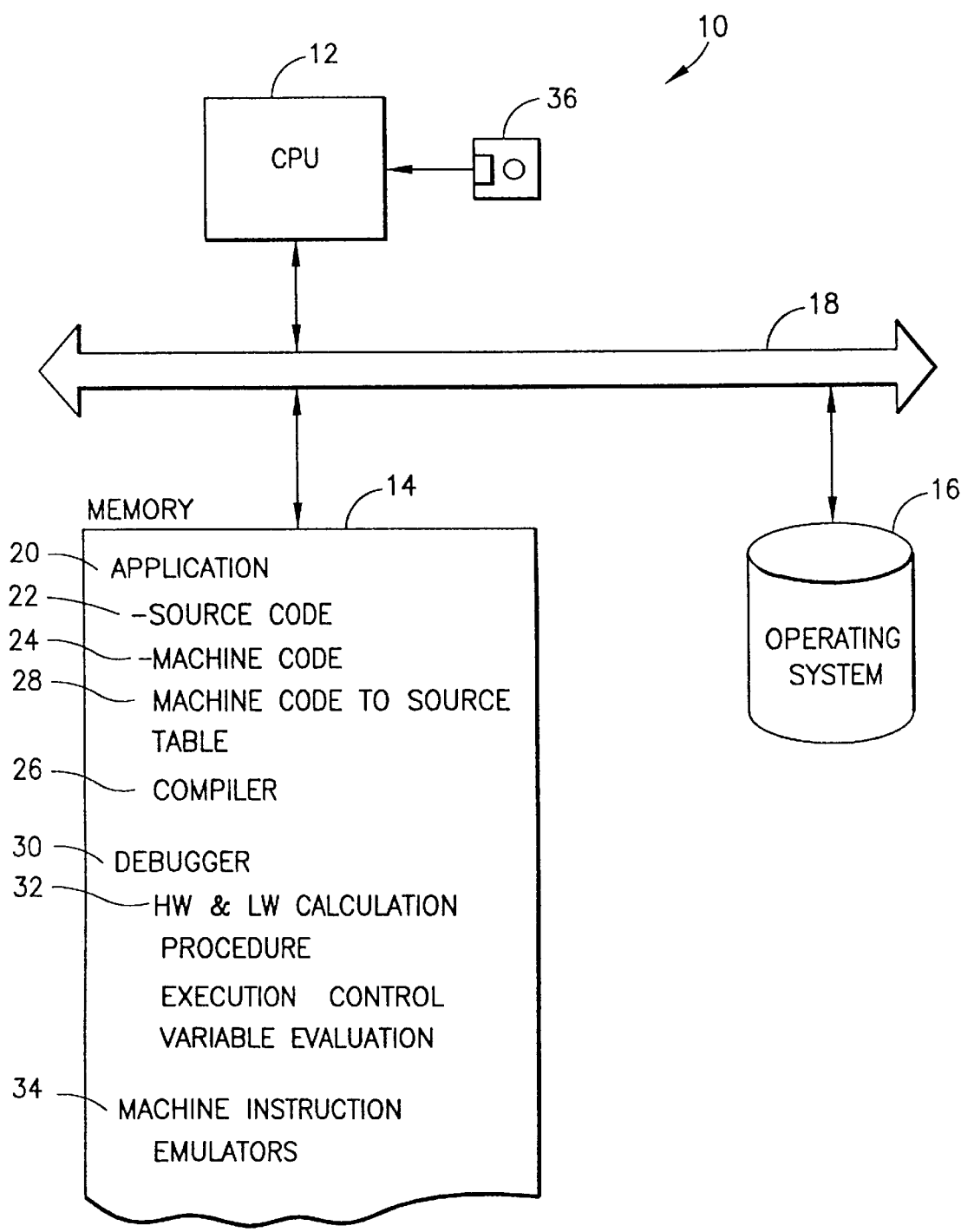
FIG. 1 is a high level block diagram of a system adapted to perform the invention

Referring to FIG. 1, a computer 10 is shown that is adapted to perform the method of the invention. Computer 10 includes a central processor unit (CPU) 12 which is coupled to a random access memory 14 and a disk drive 16 via a bus system 18. Memory 14 stores a number of programs and procedures that enable performance of the invention. An application 20 is stored in both source and machine code (i.e., binary) forms 22 and 24, respectively. A compiler 26 performs all the standard compile actions of prior art compilers, and further derives a machine code to source table 28 which relates each machine code instruction in machine code 24 to one or more source constructs in source code 22. (A "source construct" includes a source line, source instruction or a source statement).

A debugger 30, in addition to including the normal functions of a debugging program, also includes code for: (i) finding "High Watermarks" (HWs) and "Low Watermarks" (LWs) and Exit Points (EPs) (to be described in detail below with respect to code 32); (ii) an execution control procedure which determines whether to ignore, emulate or execute instructions within a high/low watermark region (to be described in detail below); (iii) a machine code emulator for the host computer; and (iv) evaluating user variables in a way that appears to "restore source code order" to actions specified by the compiled machine code.

A disk drive 16 stores, among other programs, the operating system for computer 10. Further, while each of the programs and procedures shown in memory 14 are already indicated as loaded therein, it is to be understood that they may be contained on one or more memory media 36 and selectively downloaded therefrom, as they are required.

Figure 2:
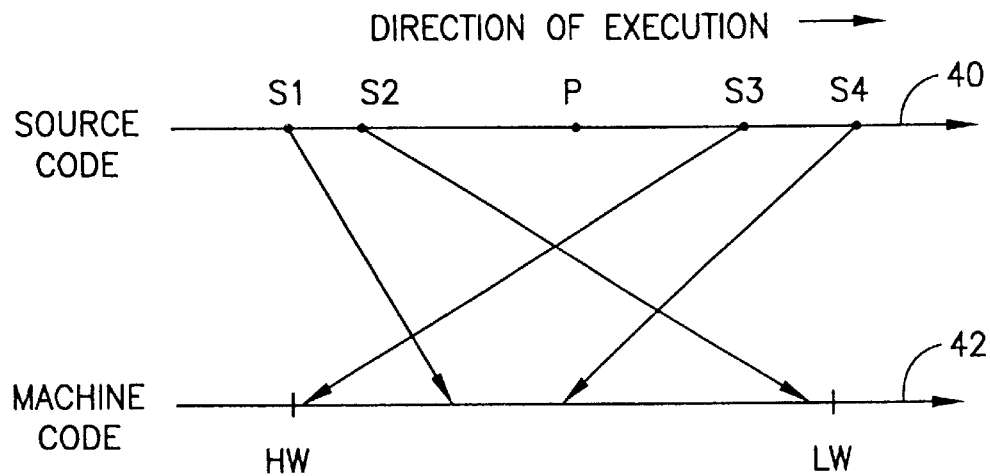
FIG. 2 is a schematic illustrating the relationships between a source breakpoint and the corresponding compiled machine code sequence.
Figure 3:
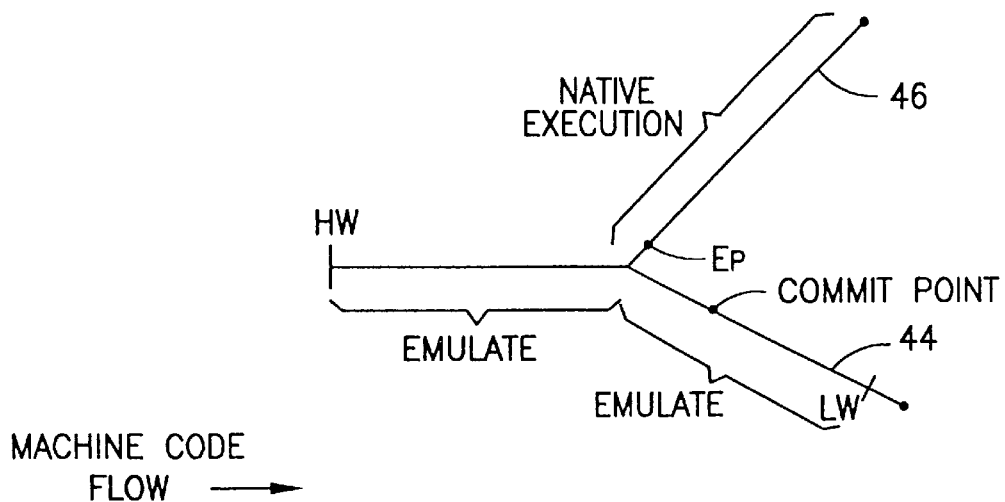
FIG. 3 is a schematic illustrating the relationship between an exitpoint, a commitpoint, an HW and an LW in a machine code sequence when a branch occurs and further illustrates when a debug program executes machine code in the emulation mode or in the native mode.
Figure 4A:
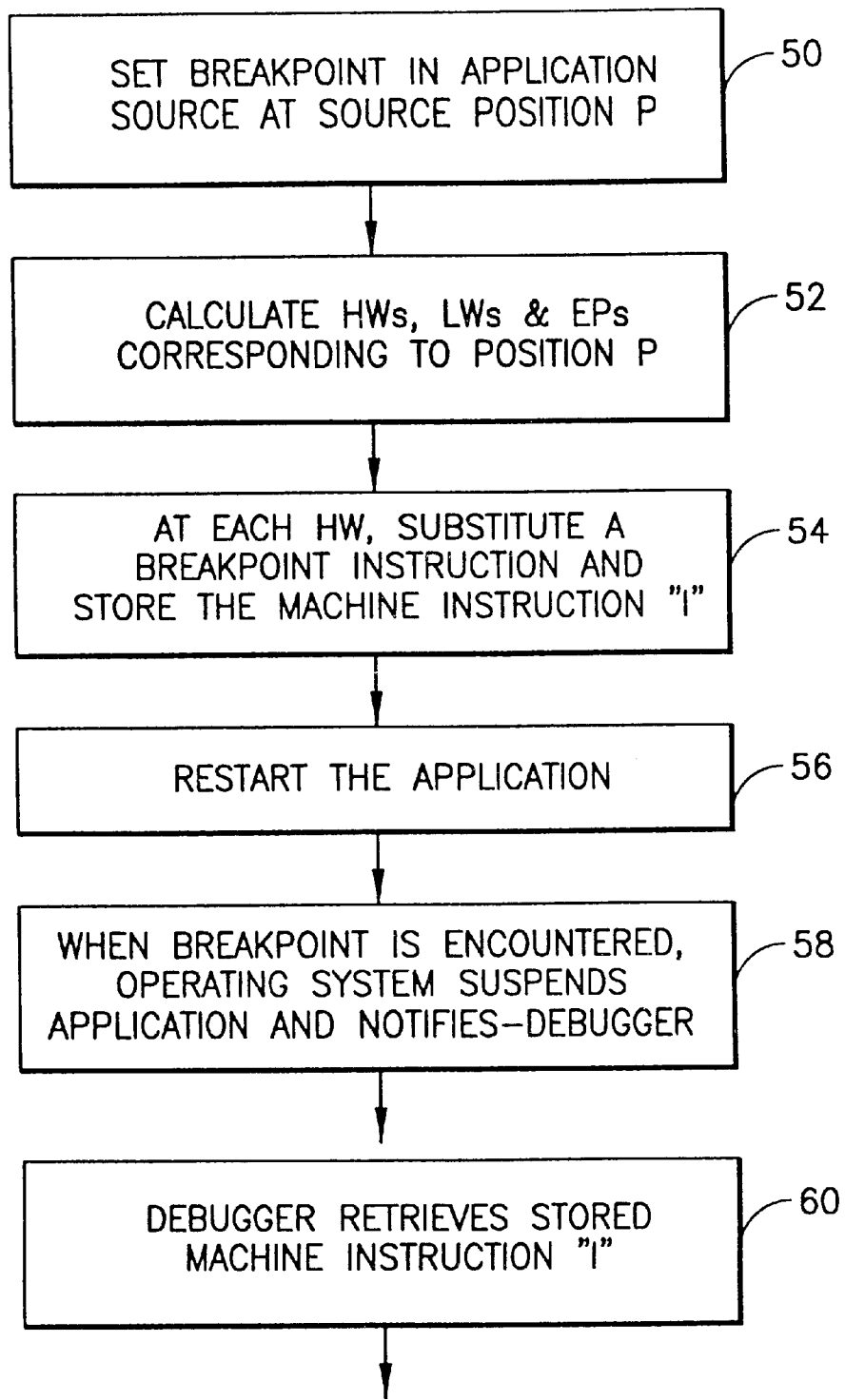
Figure 5:
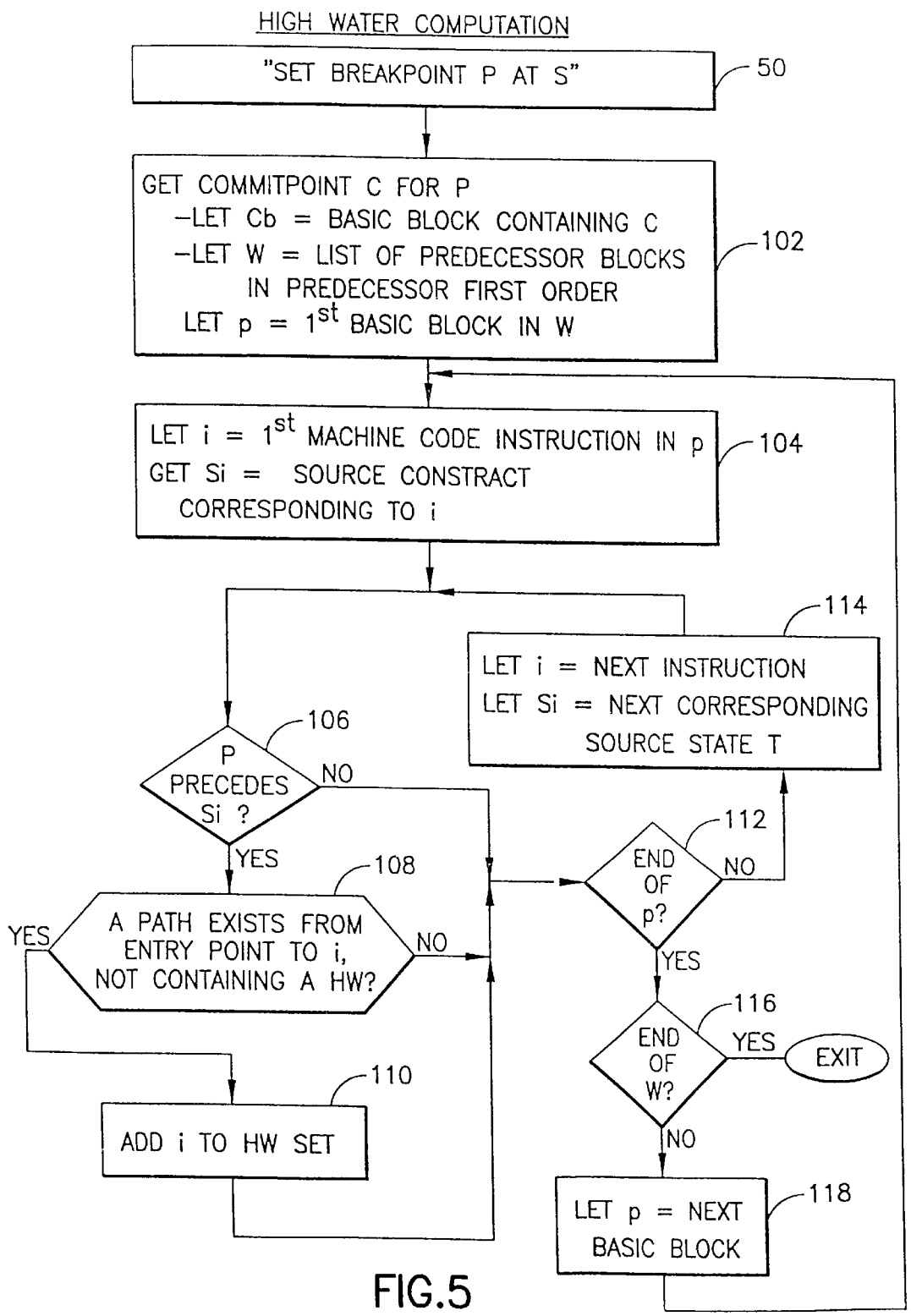
FIG. 5 illustrates a flow diagram of the method used to calculate an HW.

Hereafter, the invention will be first described in high level terms with reference to FIGS. 1–3, followed by a detailed description of the procedures that are implemented by the invention, in conjunction with the flow diagrams shown in FIGS. 4–6.

The basic idea of the method of the invention can be understood, using the example shown in Table 1. Table 1 shows a listing of C-style source code with three statements and the corresponding assembly code for the source statements, optimized by scheduling and register allocation. Each assembly code instruction is annotated with the number of the source statement it originates from.

TABLE 1

| SOURCE | ASSEMBLY CODE | SOURCE LINE # |
|---|---|---|
| 1: a = b + c; | 1: ld r1, b | <1> |
| 2: x = 2; | 2: ld r2, c | <1> |
| 3: y = z * 3; | 3: ld r5, z | <3> <---- |
|  | 4: mul r6 r5, 3 | <3> |
|  | 5: mov r4 2 | <2> |
|  | 6: add r3, r1, r2 | <1> |

Assume the user sets a breakpoint at source line 2. Since assembly instruction 3 originates from source line 3, the debugger has to take over control of execution at instruction 3 to make sure that none of the instructions which shouldn't be executed before the breakpoint (i.e., post-breakpoint instructions) has been executed. Before the debugger can hand over control to the user and start taking user requests, assembly instruction 6 has to be executed because it originates from source line 1 which should be executed before the breakpoint (i.e., a pre-breakpoint instruction). Accordingly, the method of the invention assures that all pre-breakpoint instructions are executed or emulated in breakpoint processing during debugging, and that post breakpoint instructions are ignored.

The invention preferably executes the prebreakpoint instructions by emulation, enabling intermediate variables to be recovered and later used for debug purposes. Also, the invention accommodates function calls and loops so as to enable more efficient debugging of the machine code.

As will become apparent from the description below: (1) emulation is employed as the mechanism for selective execution of machine instructions. (2) A "change" history is used to represent program states, enabling a handling of register reuse and recovery of correct mapping of variables to machine locations. (3) The overhead of emulation is minimized by native execution (i.e., execution of the machine code) of function calls and loop bodies. (4) The limits of a region to be emulated are calculated at debug time and multiple breakpoints, including nested breakpoints are handled. The method of the invention further enables a comparison of the results of two passes of emulation (in different orders) to detect a class of bugs that are particularly hard to find: bugs caused by optimizer errors and user bugs that manifest themselves only in the optimized executable.

Selective Emulation

When the user sets a breakpoint at source location P immediately prior to source construct S, a machine code region (hereafter referred to as high/low watermark region or HLWR) is calculated that is bounded by high- and low-watermarks (HW,LW) and possibly exitpoints. A HW is the first machine instruction on some path that derives from a source construct occurring after source location P. A LW is the last machine instruction on some path that derives from a source construct occurring before source location P.

With reference to FIG. 2, a series of source code constructs are represented by line 40 and a corresponding series of machine code instructions are represented by line 42. HW is the limit of code movement, after compilation, of machine code that corresponds to source constructs following P. LW is the limit of code movement, after compilation, of machine code that corresponds to source constructs preceding P. Note that source constructs S1 and S2 precede P, but that source constructs S3 and S4 do not. Nevertheless, their corresponding machine code instructions appear in a mixed order, but one that is bounded by HW and LW. This allows later segregation of machine code instructions that are to be emulated (i.e., those deriving from source constructs which precede P) versus those machine statements that are to be ignored (i.e., those deriving from source constructs which follow P.

By definition, when program execution reaches HW, it is known that nothing that would normally happen after P has happened yet. Similarly, when program execution reaches LW, it is known that everything that would happen before P has happened. Thus, when the user sets a source breakpoint at P, the debugger actually sets a machine code breakpoint at HW. When such a breakpoint is encountered, the debugger then scans forward in the machine code, looking for instructions that correspond to source constructs preceding P. and emulates only those instructions. When the debugger reaches LW, it stops and uses the combination of the states of the machine code being debugged and the emulated states to answer user queries about variable values.

It is, of course, possible for a source breakpoint to have many HWs and LWs (for example, if an instruction is moved up into both branches of a conditional). It is also possible for the region bounded by the HWs and LWs (i.e. the HLWR) to have internal control flow. In particular, a speculatively scheduled instruction may cause a machine code breakpoint to be encountered, even when control does not reach the source level breakpoint.

To detect such occurrences, a "commitpoint" is identified by compiler 26. In its simplest form, a commitpoint is a machine code location chosen so that control flowing to that location serves as a confirmation that the source breakpoint has indeed been encountered, and should be reported to the user. FIG. 3 illustrates a commitpoint along branch line 44. By contrast, branch line 46 includes an exitpoint EP which is defined as an instruction that is an immediate successor to some instruction in the HLWR that is not itself in the HLWR. As will later be understood, when control flow encounters an EP, the debugging action ceases emulation and returns to native execution of the machine code.

When a basic block of code is eliminated by the compiler, there may be no correct machine code location for a commitpoint. (A basic block of code is a sequence of code having one entrance point, one exit point and generally ends with a branch instruction). To handle this, commitpoints have a predicate associated with them. A source level breakpoint is considered to be encountered only when control flows to the commitpoint's machine code location, and the predicate is true at that point. HWs are calculated along every path from the beginning of the function containing P to the commitpoint for P, and on every path from the commitpoint back to P. For example, in the case of loop-invariant code motion, the HW for a statement inside a source loop may be outside the machine code loop. An additional HW lies inside the loop so that a machine code breakpoint is encountered for every iteration of the loop. Commitpoints are identified by the compiler in a manner that preserves source order—if Q follows P in source order, the commitpoint for Q cannot precede the commitpoint for P in the machine code. Based on this information, and on calculation of HW and LWs, the debugger calculates a set of exitpoints.

An exitpoint encountered during the emulation phase indicates to the debugger that the source level breakpoint is not to be reported. When the user continues from a breakpoint (or when the debugger does not report a breakpoint), the debugger makes a second pass over the emulated region, selectively emulating the machine code instructions that were skipped over in the first pass. It then writes out the emulated state to the program being debugged, and resumes the program being debugged in native mode.

Certain code transformations (for example, loop unrolling) result in a single source construct having multiple instances in the machine code. Each instance is identified with a separate commitpoint, and each instance be treated independently: i.e., each instance has its own HWs, LWs and exitpoints.

Change History and Variable Reporting

In general, it is safe to emulate machine code instructions in source order since the compiler's optimizer must respect the data dependencies of the source program when reordering the instructions. However, when machine resources are shared between different source-level variables, a naive reordering fails. In particular, register allocation that is performed after instruction scheduling can cause false dependencies in the machine code. For example consider the following transformation:

c=0; ¦b=r1+1;

b=a+1; //last use of a ¦r1=0;

where: both a and c are mapped to the same register r1.

If a breakpoint is set at the second of the two source lines, then r1=0 must be emulated before b=r1+1. However, at the point when b =r1+1 is emulated, the value of r1 used for it must be the value that it had before it was overwritten by r1=0. To accomplish this, the emulated state of the program being debugged is represented as a change history: i.e., a list of change records, one for each emulated instruction. A change record stores the modified values of registers and memory. This enables a roll back to a state as needed, when emulating instructions that are out of order.

The change history mechanism is also useful when it is desired to recover the value of a variable at a breakpoint. The user expects these values to have the effects of executing all, and only, the source statements before P. Due to optimization, program variables may either be eliminated or may reside at multiple locations at different program points. It is thus preferred to build range data structures which provide the debugger with run-time locations of variables. A variable's location is given by a set of range records, each consisting of a definition point and a machine location. A definition point is the address of the instruction (or instructions) that moves the variable to the specified location.

When the location of a variable X is to be found, the control flow graph is scanned backwards to find all the definition points for X that aren't superseded by following definition points for X. If all the definition points map X to the same location, then the value of X may be reconstructed. The control flow graph is then scanned forwards to see if this location for X is overwritten by a definition point for another variable, Y. If so, then X is dead, else its value is reported. As a special case, when the definition point for Y is emulated (instead of being executed), the change history can be used to ignore the emulation of this definition point.

Native Execution

Emulating machine code instructions is typically several orders of magnitude slower than executing them in the machine code, as executed by the hardware. Hence there is a strong performance incentive for native execution of parts of a potentially lengthy HLWR. Thus, it is preferred to execute two types of machine code constructs natively, i.e., (i) function calls and (ii) loop bodies.

Function calls: Execution of function calls involves the following steps;

1. Write the emulated state changes to the address space of the program being debugged, for all the instructions emulated before the call. Since instructions are emulated in source order this step ensures that the function to be executed sees a program state that includes the effects of all the statements before the call.
2. Save the registers of the program being debugged in a private buffer.
3. Let the function call execute (using operating system support) and regain control at its return point.
4. Compare the registers of the program being debugged with the saved registers, and add records to the change history for the registers modified. In the absence of precise side-effect analysis, it is not possible to add change records for memory modified by the call. It is assumed that memory locations are not reused for different variables at different points in the program. Since the change history mechanism described in the previous section addresses the problem of register reuse, the lack of change history for memory locations does not affect correctness. Subsequent instructions see the memory changes due to the function call directly from the state of the program being debugged.
5. Continue pending HLWR processing after the call instruction. Loop bodies: A machine code loop that precedes a source level breakpoint P in source order is also a candidate for native execution. If no instructions have been moved into the loop, all the instructions in the loop must be executed, and a mechanism similar to the one described for function calls is used. However instructions belonging to source constructs after P may be moved inside the machine code loop. These instructions should be skipped. When data flow analysis indicates that the operands of such an instruction reach the loops exit points, the instruction are replaced by a NOP and it is emulated on loop exit. Otherwise, it is replaced with a breakpoint and the values of the operands are saved before they are overwritten. There is a large performance penalty for this, but it is preferable to emulating the entire loop.

Code Movement Over Branches

Machine code instructions deriving from a source construct before a source level breakpoint P may be moved over a branch belonging to a source construct after P. In the absence of native execution, handling such cases is straightforward—simply emulate all the machine code instructions that affect the outcome of the branch in order to determine control flow, and then throw away the emulated state. A second pass that emulates only the machine code instructions that precede the breakpoint P in source order can then use the control flow information from the first pass to decide which way to go at the branch.

However, native execution complicates the problem—the lack of accurate change histories for a natively executed region means that the effects of an instruction, executed only to find the outcome of a branch, cannot be thrown away.

Instead of determining control flow at the branch by emulation at debug time, Instead, the compiler is controlled to emit special debug information which tells the debugger which sequence of instructions to emulate. Instructions may be chosen from either or both sides of the branch. This implies that instructions can be safely executed that may not be executed during normal execution of the machine code. For instructions that are emulated, this is always the case, since their effects are thrown away from the change history. For instructions that are executed in native mode, the only way that they can be present on one side of the branch and not on the other is if the compiler proves that it doesn't matter whether they are executed or not (since the source semantics specify that they should be executed). Thus executing them is safe.

Debug Information Extensions

To support the instruction reordering feature of the invention, the debug information that is typically emitted by compilers is extended.

To compute which lines precede and which lines follow the source breakpoint in the source, a source control flow graph is provided.

The compiler emits commitpoints for every possible breakpoint location. Commitpoints must preserve source order. In cases where a single source location has more than one commitpoint (due to code replication), each commitpoint also carries a static instance identifier.

A mapping from machine code instructions to source constructs they came from. In general, a machine code instruction may belong to any number of source constructs (since it may be part of a common subexpression calculation). For machine code instructions that come from source constructs that have multiple instances in the machine code, a static instance identifier is also required.

For each loop in the source, a loop identifier (a simple integer) is required, a mapping from loop identifiers to the source control flow graph, a list of machine code back edges corresponding to the loop, and for each back edge, a loop increment. The loop increment is simply the number of source iterations completed per machine code iteration. These are associated with back edges rather than with source loops since a single source loop may be transformed into multiple machine code loops, each with a different number of source iterations per machine code iteration.

Whenever a single source construct is replicated in many places in the machine code, its commitpoints and machine code instructions are required to carry a static instance identifier. A source construct may belong to multiple loops, some of which get unrolled. In this case, a separate relative iteration number is required for each loop that is unrolled. For functions that get inlined, it is required that the line number that an instruction came from be identified as well as the line number of the function call responsible for the inlining. This enables a determination of whether an inlined instruction precedes or follows the source breakpoint, whether it is in the caller or in the (inlined) callee.

For instructions moved down over a conditional branch, extra debug information may be required as specified in the previous section. This extra information consists of a sequence of code addresses specifying the instructions to emulate.

A range record for each definition of a user variable, as discussed above.

Calculating High and Low Watermarks and Exitpoints

In the absence of loops, calculating the HWs for a source breakpoint is straightforward—simply visit (in predecessor first order) each machine code basic block that precedes a commitpoint. Within each basic block, identify the instructions that correspond to source constructs following the breakpoint. These instructions may be called scheduled-early instructions. If there is a path from the beginning of the function to a scheduled-early instruction that does not contain any HWs, then that instruction is a high watermark. If there is a path from the beginning of the function to the commitpoint that does not contain any HWs, then the commitpoint itself is a high watermark. This ensures that there is a HW on every path from the beginning of the function to the commitpoint.

To deal with loops, A notion of dynamic instances of instructions is used. At debug-time, each instruction has a set of counters associated with it, with one counter for each machine code loop it belongs to. At any point in the execution of the program, the value of the counter corresponding to a particular machine code loop is given by:

$$\Sigma \text{times traversed}(b) \times \text{loop increment}(b)$$

where b ranges over back edges. An instruction along with a particular value of its associated counters is called a dynamic instance of an instruction.

Given a dynamic instance and the relative iteration number of an instruction, the source iteration the dynamic instance belongs to can be calculated. This in turn can be used to check which (if any) dynamic instances of an instruction follow a particular dynamic instance of a commitpoint in source order.

The HWs for each commitpoint instance correspond to the earliest dynamic instruction instances that precede the commitpoint instance in machine code order, but follow it in source order. Since each commitpoint instance cannot be considered individually, the instructions are analyzed in the enclosing function, looking for certain patterns:

An instruction outside the loop may be high watermark for a finite number of the dynamic instances of the commitpoint (for example, a loop invariant instruction pulled out of the loop may be a high watermark for the first instance of the commitpoint).

An instruction outside the loop may be the high watermark for all instances of the commitpoint (for example, an instruction from after the loop that is moved over the loop).

The ith dynamic instance of an instruction inside the loop may be the high watermark for the i+kth dynamic instance of the commitpoint, where k is a statically determined constant (for example, an instruction moved around the back edge of the loop).

Based on this analysis, a partition is created of the dynamic instances of the commitpoint, each of which has HWs that belong to one of the categories listed above. The number of dynamic instances of the commitpoint that need to be examined is bounded by the highest relative iteration number of an instruction inside the loop. This is because a commitpoint instance with a higher relative iteration number is the same as a preceding instance.

Using dynamic instances does not require that the back edge traversals be counted at run time. Only the difference in counter values between the high watermark and its corresponding dynamic commitpoint instance need to be determined.

The algorithm for calculating LWs is similar. Calculating exitpoints is straightforward: for each basic block that follows a HW (in machine code order) but precedes the corresponding dynamic commitpoint instance (also in machine code order), check which of its successors don't precede the dynamic commitpoint instance (again in machine code order). Edges from the basic block to such successors are exitpoints for the dynamic commitpoint instance.

Multiple Breakpoints

The preceding discussion has concentrated on how the method of the invention works when the user sets a single breakpoint in the source. However, there may be multiple active breakpoints at a time, and their HLWRs may overlap. This section discusses how these are handled. First note that HWs occur in source order, i.e. if source location Q follows source location P, then the HW for Q cannot precede the high watermark for P. This guarantees that the order of encountering machine code breakpoints is the same as the order in which the source breakpoints occur. (However, since HWs and LWs are found only within the confines of a function, it is possible that a function call in an HLWR results in hitting of a breakpoint in the callee that should be reported before the breakpoint in the caller. Such breakpoints are called nested breakpoints and are discussed below.)

It is possible for multiple source breakpoints to share a high watermark. When these breakpoints can be strictly ordered, they are processed one at a time, beginning with the one that occurs earliest in source order. The rest are added to a pending breakpoints list. When the user continues, the next breakpoint from the pending breakpoints list is chosen, and instructions that precede it, but follow the previous breakpoint, are emulated, and the debugger may stop again without resuming the program being debugged.

When multiple unordered source breakpoints (for example, breakpoints in different branches of a conditional) share a HW, multiple emulation passes are made over the machine code. During the first pass, only those instructions are emulated that precede all the source breakpoints. If this results in a commitpoint being reached, the corresponding breakpoint is reported. On the other hand, if an exitpoint is reached for one of the breakpoints, it is eliminated from the set of breakpoints, and another emulation pass is started with one less breakpoint. This is continued until only one (or possibly, none) of the breakpoints remains.

When emulating instructions in a HLWR, a function call may be encountered that precedes the source breakpoint. The called function may itself contain breakpoints, and since the function call precedes the breakpoint in the caller, the breakpoint in the callee should be reported first. To accomplish this, a stack of change histories is maintained. On encountering a nested breakpoint, the partial change history constructed for the caller is pushed onto this stack, and a new change history is started for the callee breakpoint. When processing of the nested breakpoint has been completed, the partial change history of the caller is popped off the stack and again becomes the current change history.

Certain language constructs (C's longjmp, C++'s exceptions) can cause the program stack to be unwound at unexpected times. The debugger is required to be able to intercept such events, so that the change history stack can also be unwound at the same time.

Automatic Bug Detection

The reordering of instructions performed by the debugger may hide certain user errors: use of uninitialized variables and writes beyond array bounds are two classic examples. When this happens, the machine state produced after reordering is no longer the same as the machine state produced when executing instructions without reordering. To detect this, the debugger does a second pass over each HLWR, emulating the instructions in "machine code order" (i.e. the order in which instructions appear in the executable) and compares the results of the two passes. A difference in the effects of any instruction points to a user bug or to an optimizer error. In fact, another application of this comparison step is to automatically find optimizer errors.

Native function calls are another source of complexity. Since a function call may modify arbitrary memory locations, the state of the program being debugged cannot be accurately reset, before beginning a second emulation pass. However, it is noted that the set of memory locations accessed before the call and modified by the call must be the same in both emulation passes (in the absence of optimizer and user errors). This means that it is sufficient to simply record the values for these memory locations in the change history. Other memory locations are not recorded, and any discrepancies in the two emulation passes due to this must point to an optimizer or user error.

Since accurate change histories are not maintained for native function calls, and since system calls may have extra-process side-effects, function calls can generally be executed only once. Depending on the level of performance penalty that is acceptable, several solutions are possible. At the simplest level, the parameters of the function (as calculated in the two emulation passes) can be checked to see that they are the same as just before the call is made, and if so, the change record can be copied for the function from the first emulation pass. If the parameters differ, an error is indicated. More thorough error detection requires checking that the function has no data dependencies on instructions that follow it in source order. For example, it should not access any unsaved registers or memory locations that are written to by instructions that follow the function call in source order but precede it in machine code order. This checking can be done using a generalization of watchpoints that detect both reads and writes.

Debug Procedure for Compiled Machine Code

Referring to FIGS. 4a and 4b, the operation of the invention will be described in conjunction with the flow diagram shown therein. Further, the flow diagrams shown in FIGS. 5 and 6 will also be considered as they provide additional details of certain steps shown in FIGS. 4a and 4b. The following description considers what happens when breakpoint P is not within a loop.

Initially, the user sets a breakpoint P in the Application source, the breakpoint P indicating a point in the source wherein execution is to stop (step 50). At such time, debugger 30 calculates HW(s) and LW(s) and EP(s) that correspond to breakpoint P (step 52). It will be recalled that an HW is the first machine code instruction on some path that derives from a source construct which occurs after breakpoint P. Further, an LW is the last machine code instruction on some path that derives from a source construct occurring before breakpoint P. An HLWR is the set of instructions that occur on a path from a HW to a LW in the machine code listing. Finally, an EP is an instruction that is an immediate successor to some instruction in the HLWR that is not itself in the HLWR.

Turning to FIG. 5, details illustrating the method for calculating an HLWR shown. Initially, as indicated with respect to FIG. 4a, the user enters a command "set breakpoint at P" (step 50). Thereafter, debugger procedure 30 retrieves the commitpoint C for source position P from a table within the compiled application 24 (step 102). As indicated above, a commitpoint is a machine code location that is chosen so that control flowing to that location serves as a confirmation that the breakpoint P has been encountered. Commitpoint C is determined by compiler 26 during the compile procedure and is stored in a table which relates commitpoint C to source position P, thereby enabling its later retrieval.

Then, debugger 30 determines the basic block containing commitpoint C and designates it "Cb". Further, a list of predecessor basic blocks, in predecessor first order, is determined and the list is designated as "W". The first basic block in W is designated as "p".

Next, debugger 30 retrieves the first machine code instruction in p, designating it as "i", and then retrieves the source statement (Si) which corresponds to machine code instruction i (step 104). Source statement Si and the corresponding machine code instruction i are retrieved from a table established by compiler 26 during the compile action.

Debugger 30 next determines whether breakpoint P precedes or does not precede source statement Si (decision step 106). If it is determined that breakpoint P precedes source statement Si, it is next determined whether a path exists from the machine code's entry point to machine code instruction "i" which does not contain a HW (step 108). If yes, machine code instruction i is added to the set of HWs (step 110) as it, itself, is a HW.

If no HW is found in the path to machine code construction i (or after machine code i has been added to the HW set), it is next determined (decision step 112) if the procedure has reached the end of the current basic block in W. If no, the procedure moves to a next machine code instruction, determines the corresponding source statement and repeats step 106 (step 114). If the procedure determines that it has reached the end of the current basic block (decision step 112), it moves to decision step 116 and proceeds to the next basic block (step 118) and continues at step 104.

Returning to decision step 106, if it is determined that breakpoint P does not precede source statement Si, it is next determined if the procedure has reached the end of the current basic block in W (decision step 112). If no, the procedure moves to a next machine code instruction, determines the corresponding source statement and repeats step 106 (step 114). If the procedure determines that it has reached the end of the first basic block (decision step 112), it moves to decision step 116 and proceeds to the next basic block (step 118) and continues at step 104.

In summary, the procedure shown in FIG. 5 illustrates how each HW is identified and is recorded for use during subsequent debug actions. It will be recalled that the procedure shown in FIG. 5 attempts to identify any machine code instruction that derives from a source statement Si occurring after breakpoint P. Thus, so long as source breakpoint P precedes source statement Si, and the condition shown in step 108 is met, then an HW is identified.

The procedure for determining LWs and exitpoints is similar to that shown for the determination of HWs and will be apparent to those skilled in the art.

Returning to FIG. 4a, the debug procedure continues at step 54 wherein, at each HW, a breakpoint instruction is substituted for the machine code instruction positioned at the HW, and the machine code instruction at that position is stored for later use.

Next, the application being debugged is restarted (step 56), and when the application encounters a breakpoint in the machine code, a signal is issued to the operating system to suspend execution of the application (step 58). The operating system then notifies debugger procedure 30 which retrieves the machine code instruction (previously resident at the encountered HW breakpoint) which was stored when a breakpoint instruction was substituted therefor (step 60).

Thereafter (step 62), debugger 30 emulates the machine instruction if it corresponds to a source construct prior to P. If it is emulated, the values which result from the emulation action are stored in a sequence of application state changes called the "change history". If debugger 30 encounters a machine code instruction which derives from a source construct occurring after breakpoint P, that machine code instruction is skipped. If debugger 30 encounters an exitpoint, the application is restarted enabling subsequent execution of the application in machine code form. If debugger 30 encounters a LW, it reports the discovery of a breakpoint at source statement S and awaits further user instructions.

Figure 6A:
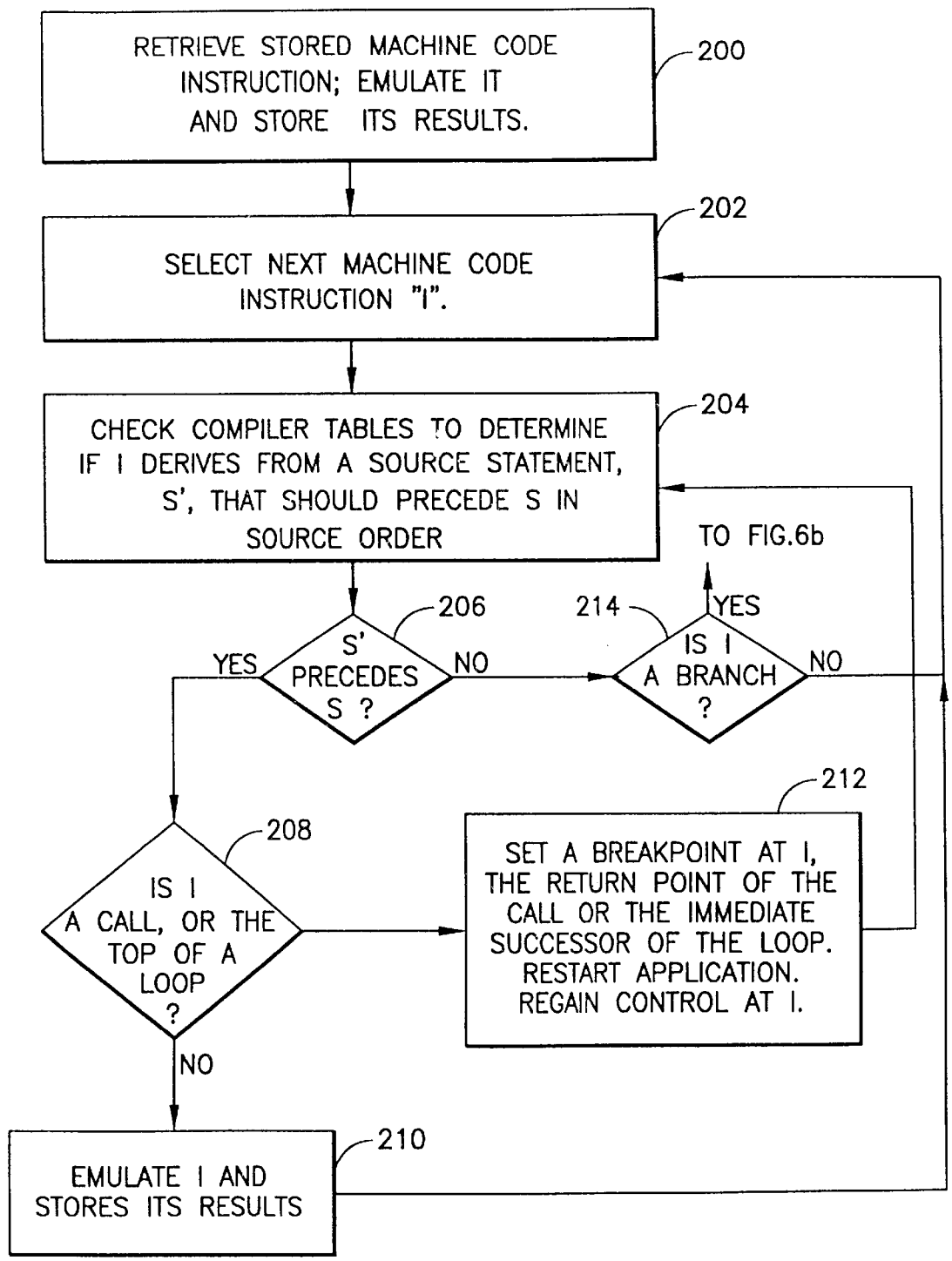
FIGS. 6a and 6b illustrate a logic flow diagram of the method of the invention when a branch, function call or loop is encountered.
Figure 6B:
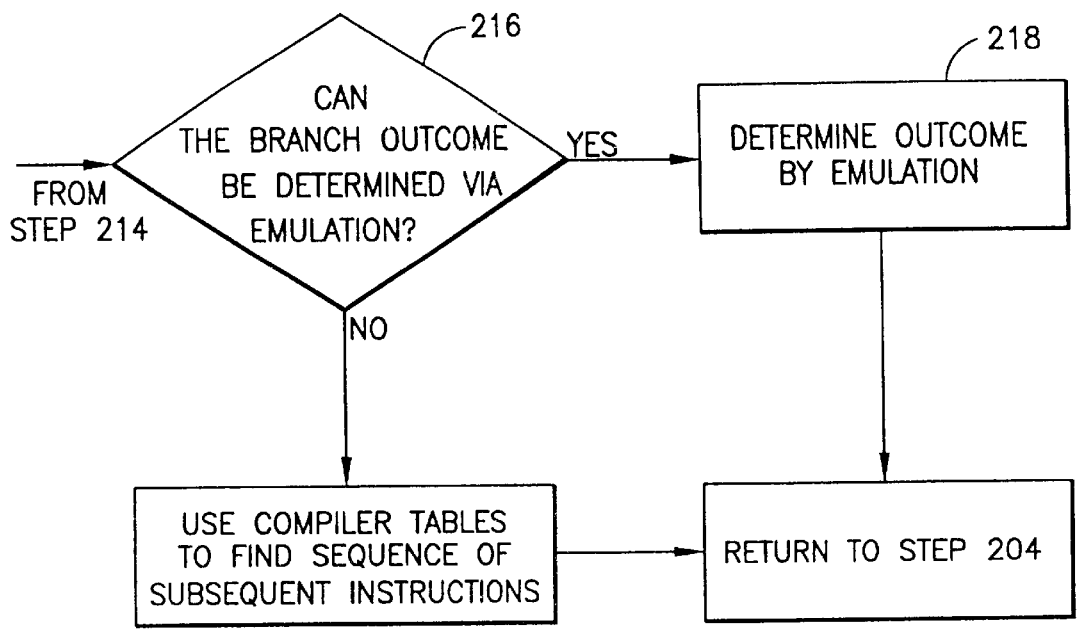

The above description has considered the case where neither a branch nor a loop is encountered. FIGS. 6a and 6b illustrate further detailed substeps which occur within step 62. Step 200 essentially repeats the action described, in general, at step 62 wherein a stored machine instruction is retrieved and emulated, with the results being stored. Next, a further machine instruction (I) is accessed (step 202) and table 28 is accessed to determine if the newly accessed instruction I derives from a source statement S' that precedes breakpoint P in source order (decision step 206). If yes, it is next determined whether the instruction is a call or the top of a loop (decision step 208). If instruction I is neither, the instruction is emulated and its results are stored (step 210).

If, however, machine instruction I is a call or is 30 resident at the top of loop (step 212), a breakpoint is set at the instruction which is the return point of the call or the immediate successor of the loop. Then, the application is restarted so as to execute the call or the loop in machine code form, thereby enabling native execution of the function rather than proceeding through an emulation thereof. As indicated above, such an emulation can consume great amounts of time—for very little gain.

At the termination of the execution of the call or the loop, debugger 30 regains control at the breakpoint set at the return point of the call or the immediate successor of the loop. The procedure then recycles to step 204.

Returning to decision step 206, if source statement S' does not precede breakpoint P, a decision needs to be made as to which line of machine code to follow, if machine code instruction I is a conditional branch statement (decision step 214). If machine code instruction I is not a branch statement, the procedure merely recycles back to step 202 and continues with the selection of a next machine code instruction.

If, however, step 214 indicates that machine code instruction I is a conditional branch statement (see FIG. 6a), then If debugger 30 can determine he outcome of the branch via emulation, it does so (steps 216 and 218) and after discarding the results of instructions that were emulated only for this purpose, it uses the branch outcome to select the branch's successor instruction and continues at step 204.

Otherwise, debugger 30 consults a list of successor instructions supplied by compiler 26 to determine all succeeding instructions and continues at step 204.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for debugging a machine code of a program that has been subjected to an optimizing action, wherein the machine code may have been reordered, duplicated, eliminated or transformed so as not to correspond with the program's source code order, said method comprising the steps of:

a) deriving a table which associates each machine code instruction with a source construct for which it was generated;

b) setting one or more breakpoints in said source code;

c) determining at least one corresponding location for a breakpoint in said machine code through use of said table;

d) executing, by emulation, only machine code instructions which correspond to source constructs that precede said breakpoint in said source code order to provide for a user, execution of a sequence of said machine code instructions in accordance with a sequence of corresponding source constructs;

e) emulating the machine code instructions in the order in which instructions appear in the machine code; and f) comparing results of steps d) and e) and if a difference is detected in an effect produced by any emulated instruction, indicating a bug or an optimizer error.

2. The method as recited in claim 1, wherein step d) performs each machine code instruction by utilizing a software controlled emulation of said each machine code instruction.

3. The method as recited in claim 1, further comprising the step of:

enabling recovery of variable state(s) after each instruction has been executed by said emulation.

4. The method as recited in claim 1, wherein step c) further comprises:

c1) establishing a high watermark (HW) at each first machine code instruction in said machine code that derives from a source construct occurring after said breakpoint and is a commitpoint, where a commitpoint is a first such machine code instruction on a path from a procedure entry to a point in said machine code where control flowing to that point is a confirmation that said breakpoint has been encountered.

5. The method as recited in claim 4, wherein step c) further comprises:

c2) establishing a low watermark (LW) at each last machine code instruction in said machine code that derives from a source construct occurring before said breakpoint and is a last such machine code instruction on a path from (i) a commitpoint in said machine code, to (ii) a procedure exit point.

6. The method as recited in claim 5, wherein step d) further comprises:

d1) selectively executing by emulation machine code instructions which lie between said HW and said LW.

7. The method as recited in claim 1, further comprising the step of:

upon encountering a loop or a function call, discontinuing said emulation of step d) and natively executing said loop or function call.

8. The method as recited in claim 1, wherein steps b), c) and d) are performed by a debugging procedure.

9. The method as recited in claim 1, wherein step d), upon encountering a pre-breakpoint machine code instruction after a post breakpoint conditional branch machine code instruction, either emulates said pre-breakpoint machine code instruction if a branch outcome can be determined via emulation, or selects a sequence of subsequent instructions for execution.

10. A memory media for controlling a computer to debug a machine code of a program that has been subjected to an optimizing action, wherein the machine code may have been reordered, duplicated, eliminated or transformed so as not to correspond with the program's source code order, said memory media comprising:
- a) means for controlling said computer to derive a table which associates each machine code instruction with a source construct for which it was generated;
- b) means for controlling said computer to set one or more breakpoints in said source code;
- c) means for controlling said computer to determine at least one corresponding location for a breakpoint in said machine code through use of said table;
- d) means for controlling said computer to execute, by emulation, only machine code instructions which correspond to source constructs that precede said breakpoint in said source code order to provide for a user, execution of a sequence of said machine code instructions in accordance with a sequence of corresponding source constructs;
- e) means for controlling said computer to emulate the machine code instructions in the order in which instructions appear in the machine code; and
- f) means for controlling said computer to compare results determined by means d) and e) and if a difference is detected in an effect produced by any emulated instruction, to indicate a bug or an optimizer error.

11. The memory media as recited in claim 10, wherein means d) performs each machine code instruction by utilizing a software controlled emulation of said each machine code instruction.

12. The memory media as recited in claim 10, further comprising:
means for controlling said computer to enable recovery of variable state(s) after each instruction has been executed by said emulation.

13. The memory media as recited in claim 10, wherein means c) further comprises:

c1) means for controlling said computer to establish a high watermark (HW) at each first machine code instruction in said machine code that derives from a source construct occurring after said breakpoint and is a commitpoint, where a commitpoint is a first such machine code instruction on a path from a procedure entry to a point in said machine code where control flowing to that point is a confirmation that said breakpoint has been encountered.

14. The memory media as recited in claim 13, wherein means c) further comprises:
- c2) means for controlling said computer to establish a low watermark (LW) at each last machine code instruction in said machine code that derives from a source construct occurring before said breakpoint and is a last such machine code instruction on a path from (i) a commitpoint in said machine code, to (ii) a procedure exit point.

15. The memory media as recited in claim 14, wherein means d) further comprises:
- d1) means for controlling said computer to selectively execute, by emulation, machine code instructions which lie between said HW and said LW.

16. The memory media as recited in claim 10, further comprising:
means for controlling said computer, in response to encountering a loop or a function call, to discontinue said emulation by means d) and to natively execute said loop or function call.

17. The memory media as recited in claim 10, wherein means b), c) and d) are comprise portions of a debugging procedure.

18. The memory media as recited in claim 10, wherein means d), upon encountering a pre-breakpoint machine code instruction after a post breakpoint conditional branch machine code instruction, either emulates said pre-breakpoint machine code instruction if a branch outcome can be determined via emulation, or selects a sequence of subsequent instructions for execution.

* * * * *